May 12, 1931.  I. M. LADDON  1,804,790
AIRCRAFT
Filed Sept. 5, 1928
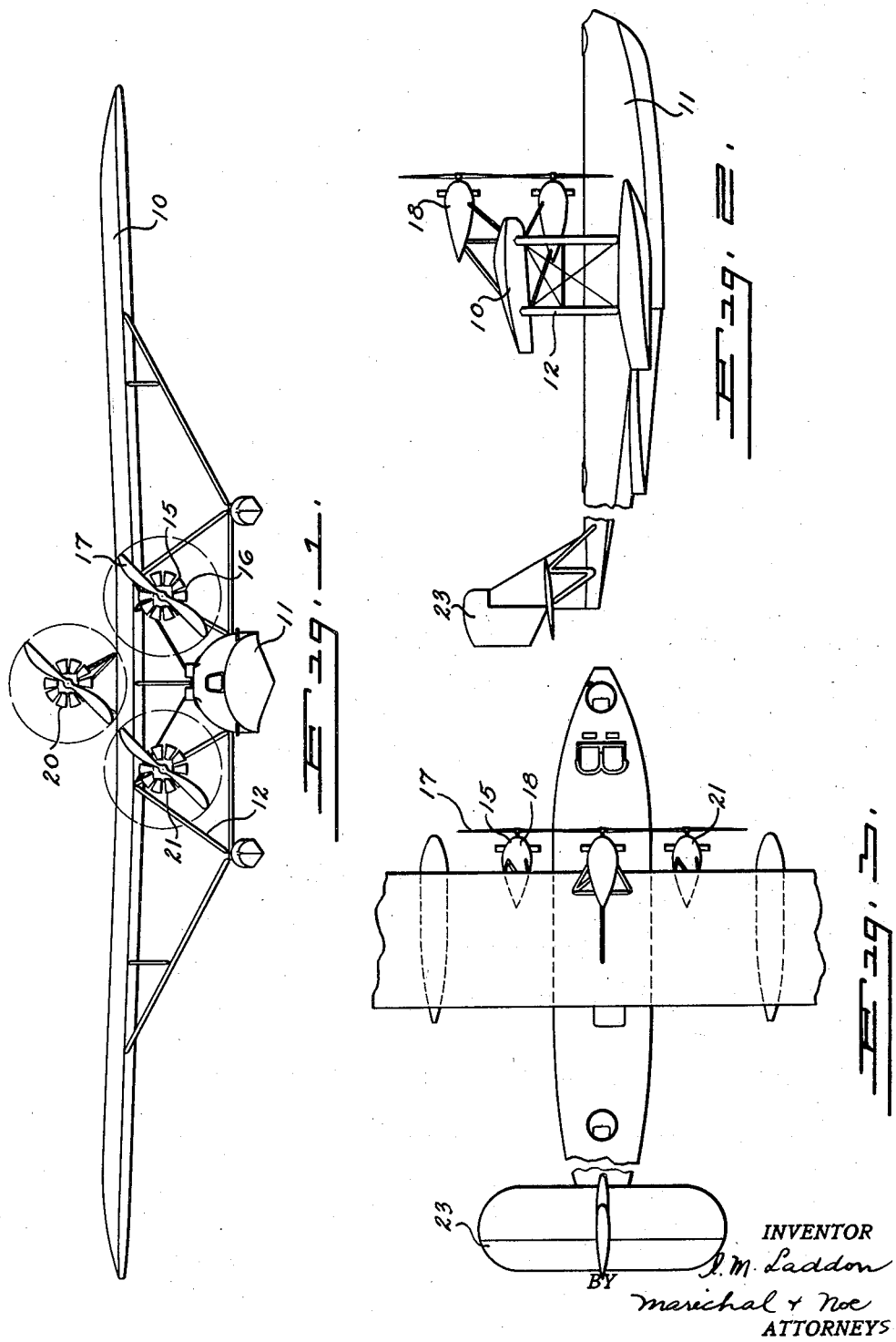

Patented May 12, 1931

1,804,790

UNITED STATES PATENT OFFICE

ISAAC M. LADDON, OF BUFFALO, NEW YORK, ASSIGNOR TO CONSOLIDATED AIRCRAFT CORPORATION, OF BUFFALO, NEW YORK, A CORPORATION OF DELAWARE

AIRCRAFT

Application filed September 5, 1928. Serial No. 303,997.

The invention relates to aircraft, and more particularly to aircraft of the heavier-than-air type provided with multiple propelling or power units.

One object of the invention is the provision of an aircraft having a series of power units arranged, as viewed in front elevation, substantially at the apexes of an approximately equilateral triangle so that the propelling forces of the aeroplane are efficiently grouped so as not to interfere with the efficiency of the individual propellers, and which provides for an arrangement which is particularly advantageous from the standpoint of flight with one of the engines not functioning, since the unbalanced yawing forces are comparatively small.

Another object of the invention is the provision of an aircraft having a series of motors and propellers arranged in this manner, a single rudder located substantially in the plane of symmetry of the aircraft being provided in the rear of the latter where it is effected by a slipstream of all three power units.

Further objects and advantages of the invention will be apparent from the following description and the accompanying drawings in which,—

Fig. 1 is a front elevation of an aircraft embodying the present invention;

Fig. 2 is a side elevation of the same; and

Fig. 3 is a top plan view of the same.

Referring more particularly to the drawing by reference numerals in which corresponding numerals designate like parts in the various views, the invention is shown as applied to a flying boat, although it is equally adaptable to other aeroplanes of the heavier-than-air type. The main sustaining plane of the aircraft is designated at 10, below which is car 11. This car is in the form of a hydroaeroplane boat body, at the rear of which is arranged the horizontal and vertical control surfaces, later to be more fully described. Suitable bracing and struts, designated generally at 12, interconnect the car and the sustaining plane.

The driving power of aeroplane is furnished by a series of similar power units each of which comprises a motor 16 and a propeller 17, the motor being enclosed in a streamlined housing 18. This housing as shown in the drawing is spaced away from the sustaining plane 10, as it has been found in accordance with this invention, that the drag or wind resistance of the aeroplane as a whole is minimized with the motor housing arranged in this manner. As shown in Fig. 1, one of these power units, as shown at 20, is arranged above the plane 10 in the central plane of symmetry of the aircraft, and the power units 15 and 21 are arranged one at each side of the plane of symmetry below the sustaining plane 10, the arrangement being such that the propelling units are located at the apexes of a substantially equilateral triangle, as viewed from the front. The length of one of the sides of the triangle slightly exceeds the propeller lengths so that the propeller discs do not overlap and thus the maximum efficiency of operation is attained. In accordance with this arrangement, the propelling units are grouped close to the center of the aircraft and none of the units is very far from the plane of symmetry so that when one of the outboard engines is not functioning the unbalanced yawing forces, which are directly proportionate to the distance of the power unit from the plane of symmetry, are quite small and not objectionable. The arrangement furthermore is one which permits longitudinal trim of the aircraft to be accomplished through varying the throttle settings of the upper and lower power plants.

In accordance with this invention it has been found that when the engine housings are grouped as shown, and spaced away from the sustaining plane in the manner described, the resistance or drag of the aircraft is smaller than would be expected, and the decrease in drag of course reflects itself in better performance of the aircraft. The engine grouping, close to the plane of symmetry of the aircraft, is particularly desirable in conjunction with a vertical rudder of the single surface type. That is, one which is located substantially in the plane of symmetry of the aircraft as distinguished from a pair of laterally spaced rudders. This single rudder designated at 23 is in the slipstream of all three power units and effective directional control is thus assured with a single rudder cooperating with the series of the power units referred to. Where, as in prior constructions, a series of engines and propelling units are strung out laterally of the aircraft and the propeller discs do not overlap the outboard engines are so far from the center line of the airplane that it is necessary to use divided or spaced rudders in order to obtain adequate directional control. These are, of course, more complicated in their construction and control. In such prior constructions if the propeller discs did overlap the propellers would flutter objectionably and there would be a consequent decrease in efficiency of operation of the individual propellers.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. In an aircraft, in combination, a single sustaining plane, a car spaced a substantial distance from and attached centrally below said plane, a power unit at each side of said car each including a motor and having a tractor propeller operating in a plane ahead of the leading edge of the sustaining plane with the circular paths of the propeller tips extending above the edge of the said sustaining plane, and a power unit centrally positioned above said sustaining plane and including a motor and a tractor propeller operating in a plane ahead of the leading edge of the sustaining plane, all of said propellers revolving substantially in a common transverse geometric plane.

2. In an aircraft, in combination, a sustaining plane, a car attached centrally below said plane, a power unit at each side of said car each including a motor and having a tractor propeller operating in a plane ahead of the leading edge of the sustaining plane with the circular paths of the propeller tips extending above the edge of the said sustaining plane, and a power unit centrally positioned above said sustaining plane and including a motor and a tractor propeller operating in a plane ahead of the leading edge of the sustaining plane, the length of said last named propeller being not greater than the distance between its axis and the axes of said first named propellers, all of the propellers of the aircraft revolving substantially in a common transverse geometric plane.

3. In a three-motor monoplane aircraft, in combination, a single sustaining plane, a car attached centrally below said plane and spaced a substantial distance therefrom, a power unit at each side of said car spaced vertically below the leading edge of the plane, each including a motor and having a tractor propeller operating in a plane ahead of the leading edge of the sustaining plane, and a power unit spaced centrally above said sustaining plane and vertically above the leading edge thereof and including a motor and a tractor propeller operating ahead of the plane of the leading edge of the sustaining plane, the length of said last named propeller being slightly less than the distance between its axis and the axes of said first named propellers, said propellers all revolving substantially in a common transverse geometric plane.

4. In a three-motor monoplane hydro airplane, in combination, a single sustaining plane, a flotation car spaced centrally below said plane, a power unit at each side of said car each including a motor having a tractor propeller operating in a plane ahead of the leading edge of said sustaining plane with the circular paths of the propeller tips extending above the leading edge of said sustaining plane, and a power unit spaced centrally above said sustaining plane and including a motor and a tractor propeller operating in a plane ahead of the leading edge of said sustaining plane, the length of said last named propeller being slightly less than the distance between its axis and the axes of said first named propellers, said propellers all revolving substantially in a common transverse geometric plane.

In testimony whereof I herto affix my signature.

ISAAC M. LADDON.